United States Patent [19]

Muwafi et al.

[11] Patent Number: 5,787,025
[45] Date of Patent: Jul. 28, 1998

[54] METHOD AND SYSTEM FOR PERFORMING ARITHMETIC OPERATIONS WITH SINGLE OR DOUBLE PRECISION

[75] Inventors: Jumana A. Muwafi, San Francisco; Mihran Touriguian, Hercules, both of Calif.

[73] Assignee: Atmel Corporation, San Jose, Calif.

[21] Appl. No.: 607,937

[22] Filed: Feb. 28, 1996

[51] Int. Cl.$^6$ .................................................. G06F 7/38
[52] U.S. Cl. ............................... 364/736.01; 364/716.02; 364/716.04
[58] Field of Search .................. 364/736.01, 715.03, 364/716.02, 716.04, 748.19

[56] References Cited

U.S. PATENT DOCUMENTS

| | | | |
|---|---|---|---|
| 4,528,640 | 7/1985 | Criswell | 364/715.04 |
| 4,878,190 | 10/1989 | Darley et al. | 364/752 |
| 4,916,651 | 4/1990 | Gill et al. | 364/736 |
| 5,222,230 | 6/1993 | Gill et al. | 395/550 |
| 5,235,533 | 8/1993 | Sweedler | 364/715.03 |
| 5,268,855 | 12/1993 | Mason et al. | 364/715.03 |
| 5,311,458 | 5/1994 | Haines | 364/750.5 |
| 5,598,362 | 1/1997 | Adelman et al. | 364/750.5 |

OTHER PUBLICATIONS

Newpaper article –Ashhok Bindra, "Two 'Lode' up on TCSI's new DSP core." Electronic Engineering Times, Jan. 16, 1995, pp. 1 and 12.

*Buyer's Guide to DSP Processors*, Berkeley Design Technology, Inc., 1995, title page and pp. 653–659.

*Primary Examiner*—Tan V. Mai
*Attorney, Agent, or Firm*—Thomas Schneck

[57] ABSTRACT

A circuit for performing either single precision or double precision arithmetic operations on data, a system including such a circuit, and a method implemented by the system. Preferably, the circuit is an arithmetic manipulation unit (AMU) which performs arithmetic operations on N-bit words in a single precision mode and on 2N-bit words in a double precision mode. The AMU concatenates two N-bit words in the double precision mode thus producing a 2N-bit operand, and performs a selected one of several arithmetic operations on the operand and a second 2N-bit operand. Preferably, the AMU performs a double precision operation in two cycles: a first cycle generating a first operand and loading the operand to an output register; and a second cycle in which a second operand is generated from a second pair of N-bit parts from the memory, the first operand is fed back from the output register, and an arithmetic operation is performed on the two operands. The system preferably includes a multi-port memory, executes instructions in pipelined fashion, and operates in a single precision mode to fetch two N-bit operands from the memory in a single pipeline cycle using two address pointers and in a double precision mode to fetch two N-bit words from the memory in a single cycle. In a double precision mode, the system can fetch two N-bit parts stored in consecutive memory locations in a single cycle, by generating and asserting to the memory two addresses in response to one address pointer.

23 Claims, 8 Drawing Sheets

METHOD AND SYSTEM FOR PERFORMING ARITHMETIC OPERATIONS WITH SINGLE OR DOUBLE PRECISION

FIELD OF THE INVENTION

The present invention relates to circuits for performing arithmetic operations on data with either single or double precision, to digital signal processing systems including such circuits, and to methods implemented by such circuits and systems. In preferred embodiments, the invention is a circuit that operates selectively in either a single precision mode (in which it performs arithmetic operations on 16-bit data words) or a double precision mode (in which it performs arithmetic operations on 32-bit data words).

BACKGROUND OF THE INVENTION

Throughout the specification, including in the claims, the term "operand" is used to denote a signal indicating of data, where the signal is intended to be processed by performing an arithmetic operation thereon. Throughout the specification, including in the claims, the expression "arithmetic operation" is used to denote a signal processing operation which implements an arithmetic operation (such as subtraction) or a logical operation (such as an "AND" or "OR" operation) on two operands.

Many different implementations of a digital signal processor (DSP) are well known in the art. A conventional DSP typically employs two physically separate memory units: a program memory for storing instructions to be executed by the DSP; and a data memory for storing data to be processed (and optionally also data that has been processed) by the DSP as a result of executing the instructions. The program memory can be a read-only memory (ROM) or a random access memory (RAM) to which data can be written and from which data can be read. The data memory is typically a RAM to which data can be written and from which data can be read.

FIG. 1 is a block level diagram of a digital signal processor (DSP) having a program memory, a data memory physically separate from the program memory, and an arithmetic computational unit (ACU) 10 of the type which can be implemented (in a manner to be described below) so as to embody the present invention. The DSP of FIG. 1 includes data memory 6 (connected to address buses AB0 and AB1 and to data buses DB0 and DB1), program memory 4, program control unit (PCU) 2, memory management unit (MMU) 3, arithmetic computational unit (ACU) 10, and input/output unit (IOU) 12.

In implementations preferred for some applications (such as that to be described with reference to FIG. 2), program memory 4 is a single port, read-only memory (ROM) with an array of storage locations 32 bits wide and 64K words deep, and data memory 6 is a dual port, random-access memory (RAM) with an array of storage locations 16 bits wide and 64K words deep. In such implementations, one port of dual port memory 6 can receive a 16-bit address (from 16-bit address bus AB0) and at the same time, the other port of memory 6 can receive another 16-bit address (from 16-bit address bus AB1). A control means is provided so that two simultaneous reads from memory 6, a simultaneous read from and write to memory 6, or a single read from (or write to) memory 6 can be performed.

MMU 3 preferably includes two independent address generation units for generating two address signals (each identifying a memory location in memory 6 for writing data to or reading data from) and asserting such address signals to address buses AB0 and AB1. More specifically, in response to control bits from PCU 2 (which have been generated in PCU 2 by decoding instructions from program memory 4), MMU 3 asserts address signals on address bus AB0 and/or address bus AB1. Data is read from the memory location (in memory 6) identified by each address into pipeline register M0 or pipeline register M1 (or data is written from data bus RB0 and/or data bus RB1 into the memory location identified by each address).

Preferably MMU 3 includes a set of eight address pointer registers (e.g., registers r0–r7 shown in FIG. 5, each for storing a 16-bit address which can be asserted to bus AB0 or AB1), an 8-bit pointer modifier register for each address pointer register (e.g., registers s0–s7 shown in FIG. 5), and a 16-bit adder for adding the contents of any selected address pointer register with the contents of a corresponding pointer modifier register, and writing the result of this addition back into the address pointer register (in response to control bits from PCU 2). MMU 3 can also include other registers (e.g., base address register BADR, and circular buffer length registers CL0 and CL1, shown in FIG. 5) for use in modifying the contents of selected ones of the address pointer registers and pointer modifier registers in response to control bits from PCU 2, or for storing one or more addresses for assertion to bus AB0 or AB1.

The address generation circuitry of the invention (to be described below) can be included within MMU 3.

In the DSP of FIG. 1, each of first data bus DB0 and second data bus DB1 is preferably 16 bits wide. In variations on the FIG. 1 system, a DSP programmed to implement the invention can have a single port data memory (rather than a dual port data memory), and single address bus and a single data bus (rather than dual address buses and dual data buses).

PCU 2 (a preferred implementation of which will be described below with reference to FIG. 3) includes instruction fetch means (for fetching instructions from program memory 4), an instruction decode unit, and registers for storing control bits generated in the decode unit (for assertion to MMU 3, data bus DB0, or the instruction fetch means).

Arithmetic computational unit (ACU) 10 preferably includes two Multiply and Accumulate (MAC) units (i.e., MAC0 and MAC1 of FIG. 5) which operate in parallel (in response to control bits from PCU 2) to perform multiplication and addition (accumulation) operations efficiently, and an arithmetic manipulation unit (i.e., the AMU of FIG. 5) which operates in parallel with the MAC units (in response to control bits from PCU 2). It is well known to design an AMU to be capable of performing any selected one of a variety of arithmetic operations (including logic operations) on two operands, such as addition, subtraction, max (determining the larger of two operands), min (determining the smaller of two operands), absd (determining the absolute value of the difference between two operands), and the logical "And," "Or," and "Xor" operations. The AMU of the invention (a preferred embodiment of which is shown in FIGS. 6 and 7 to be discussed below) can be included within ACU 10.

With reference to FIG. 1, IOU 12 includes means for monitoring the addresses on address buses AB0 and AB1 to determine the type of memory access being implemented. IOU 12 sets a flag to PCU 2 if the addresses are outside a predetermined address range (e.g., addresses for an external memory, other than memory 6, accessible through a port connected along bus AB0 and/or AB1). PCU 2 can assert wait states for slower memory accesses in response to such flags.

The present invention is desirably implemented in a DSP for use in communications operations. For example, it is contemplated that when the DSP of FIG. 1 is implemented in accordance with the invention, this DSP (identified in FIG. 2 as processor 200) will be included in a mobile digital telephone system of the type shown in FIG. 2. In the FIG. 2 system, serial port SIO of DSP 200 receives digitized speech from audio codec unit 206, and DSP 200 sends digital audio data (via port SIO) to codec unit 206 for conversion to analog form and then transmission to a loudspeaker. DSP 200 is also connected through analog front end circuit 204 to an RF transceiver 208. Circuit 204 includes means for digitizing a received signal from transceiver 208 (for baseband processing by means within DSP 200), and for converting digital data from DSP 200 into a continuous analog signal for transmission by transceiver 208. In typical implementations, circuit 204 would interrupt DSP 200 to indicate a request for or a presence of data (and circuit 204 is mapped into a memory address of DSP 200 so that circuit 204 can efficiently communicate over one of the data buses within DSP 200). Microcontroller 202 supplies control signals to all other elements of the FIG. 2 system and controls the communication protocol between the FIG. 2 system (which is typically a mobile station) and a remote base station. Typically, microcontroller 202 would be connected to a parallel port (PIO) of DSP 200.

Conventional circuits for performing double precision operations (on 2N-bit operands) have required multiple processing cycles to load a single 2N-bit operand into an accumulator (e.g., they have loaded a first N-bit part of the operand into the high locations of the accumulator, shifted the first N-bit part to the low locations of the accumulator in another cycle, and concatenated the first N-bit part with a second N-bit part by performing an OR operation in yet another cycle. Conventional circuits for performing double precision operations (on 2N-bit operands) have required more than two processing cycles to perform an arithmetic operation on two 2N-bit operands (e.g., they have loaded a first N-bit part of the first operand into a register, added the first N-bit part of the first operand to a first N-bit part of a second operand in a second cycle, moved the result to the low locations of an accumulator in a third cycle, added a second N-bit part of the first operand (and a carry bit from the previous addition operation) to the contents of the accumulator in a fourth cycle, and added a second N-bit part of the second operand to the contents of the accumulator in a fifth cycle). The present invention enables loading of a 2N-bit operand (in a double precision mode of operation) into an accumulator in a single processing cycle. The present invention also enables performance of any selected one of eight or more different double precision arithmetic operations (on two 2N-bit operands) in no more than two processing cycles per arithmetic operation.

SUMMARY OF THE INVENTION

In a class of embodiments, the invention is a circuit for performing either single precision or double precision arithmetic operations on data. In preferred embodiments, the circuit is an arithmetic manipulation unit (AMU) which has two operating modes: a single precision mode in which it performs arithmetic operations on N-bit data words (N=16 in one such embodiment); and a double precision mode in which it performs arithmetic operations on 2N-bit data words. The AMU preferably includes circuitry which operates in the double precision mode to concatenate two N-bit data words thus producing a 2N-bit operand, and circuitry for performing a selected one of several arithmetic operations (in response to a control signal) on the operand and a second 2N-bit operand. Typically, the second operand is fed back to an input of the AMU from an output register of the AMU. Preferably, the AMU performs a selected double precision arithmetic operation on two 2N-bit words from a data memory in two cycles: a first cycle in which a first 2N-bit operand is generated (by concatenating two N-bit parts read from the memory) and loaded to an output register of the AMU; and a second cycle in which the second 2N-bit operand is generated (by concatenating a second pair of N-bit parts from the memory), the first operand is fed back from the output register, and the arithmetic operation is performed on the two operands.

Other embodiments are digital signal processing systems, each including any embodiment of the inventive AMU, means for executing instructions in pipelined fashion, a multi-port data memory (having at least two ports), and means for reading two N-bit data words from the data memory (each from a different location of the memory) during a single pipeline cycle. In a single precision mode, the system can fetch two N-bit operands from the data memory in a single pipeline cycle using two address pointers, each pointer identifying the location of one of the operands, and then cause the AMU to perform a single precision operation on the operands.

In a double precision mode, a preferred embodiment of the system controls the AMU to cause it to concatenate two N-bit words read from the data memory in a single pipeline cycle thereby producing a 2N-bit operand. The two N-bit parts of each 2N-bit operand are usually, but not necessarily, stored in consecutive locations in the data memory. To fetch two N-bit parts stored in consecutive locations using only one address pointer in a single cycle, the system includes means for generating and asserting to the memory two consecutive addresses in response to one address pointer. For example, where the two N-bit parts are stored in consecutive locations in the memory and the pointer identifies an even address, the first N-bit part is fetched from the memory location determined by that address, and the second N-bit part is fetched from the memory location determined by the next odd location. For another example, where the two N-bit parts are stored in consecutive locations in the memory and the pointer identifies an odd address, the first N-bit part is fetched from the memory location determined by that address, and the second N-bit part is fetched from the memory location determined by the previous even location. The system can preferably also operate in the double precision mode to fetch two N-bit parts of one 2N-bit operand from the data memory in a single pipeline cycle in response to two address pointers, each identifying the location of one of the N-bit parts, and cause the AMU to perform a double precision operation on a 2N-bit operand (generated by concatenating the two parts) and a second 2N-bit operand (from an output register of the AMU).

By providing the capability to fetch two N-bit parts of a 2N-bit operand in response to a single address pointer, the invention enables the system to execute a wider variety of programs (including more efficiently coded programs) including instructions for double precision arithmetic operations than the system could if it required two address pointers to fetch a 2N-bit operand from the data memory for use in executing each double precision arithmetic operation.

Methods implemented by the described circuits and systems are also within the scope of the invention.

DETAILED DESCRIPTION OF THE PREFERRED EMBODIMENTS

Figure 1:
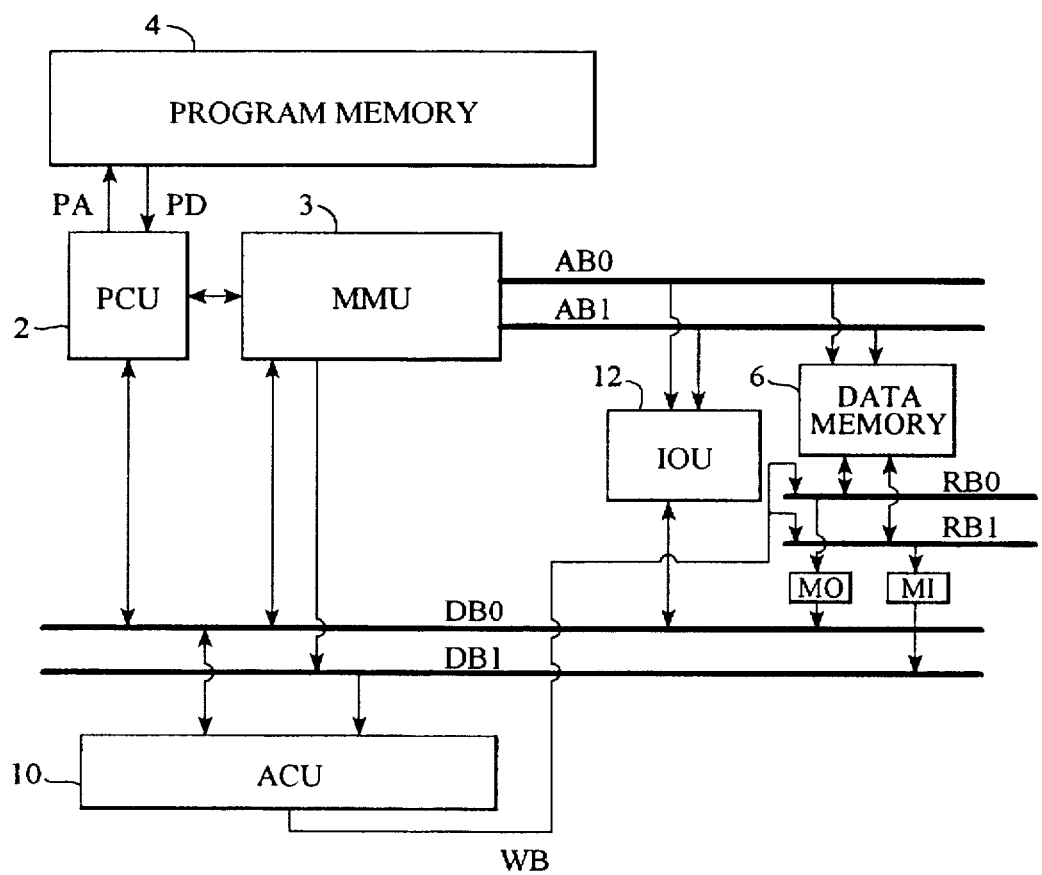
FIG. 1 is a schematic block level diagram of a digital signal processing system (DSP) including a program memory, a dual port data memory, general purpose data buses (DB0 and DB1), and a dedicated write bus (WB), which can be implemented to embody the invention.
Figure 2:
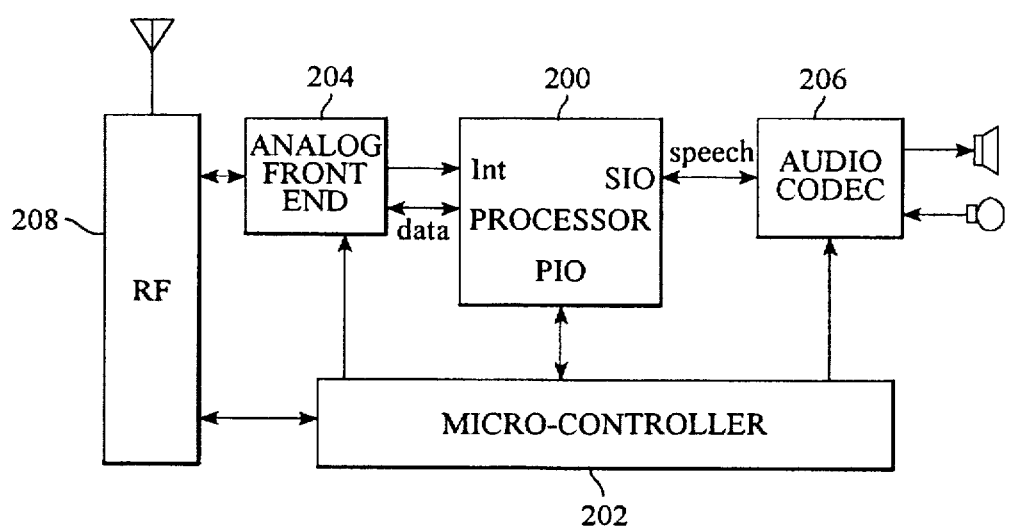
FIG. 2 is a schematic block level diagram of a mobile digital telephone system which includes the DSP of FIG. 1.

In a preferred embodiment, the present invention is implemented in a digital signal processor (DSP) of the type described herein with reference to FIGS. 1, 3, 4, and 5 (which can be included in a system of the type shown in FIG. 2). Additional aspects of such a DSP are described in U.S. patent applications Ser. No. 08/581,431 entitled "Digital Signal Processing Method and System Employing Separate Program and Data Memories to Store Data" by M. Touriguian, G. Fettweis, and I. Verbauwhede, Ser. No. 08/581,167 entitled "Digital Signal Processing Method and System Implementing Zero Overhead Nested Loops" by K. Gupta, M. Touriguian, I. Verbauwhede, and H. Neff, Ser. No. 08/581,320 entitled "Digital Signal Processing Method and System Implementing Pipelined Read and Write Operations" by I. Verbauwhede and G. Fettweis, and "Circuit for Rotating, Left Shifting, or Right Shifting Bits" by J. A. Muwafi, G. Fettweis, and H. Neff (Atty Docket No. TEKN-6300), all filed on Dec. 29, 1995 (and assigned to the assignee of the present application), the disclosures of which are incorporated herein in full by reference.

In the preferred embodiment of the inventive system, MMU 3 includes "dual address generation" circuitry (e.g., the circuitry to be described with reference to FIG. 8) for generating two address signals (during a single pipeline cycle of the system) in response to a control signal from PCU 2 specifying a single address pointer. The two address signals are then used for reading two N-bit portions of a single 2N-bit word from data memory 6 (during a subsequent pipeline cycle). Typically then, the two N-bit portions are received and processed by the AMU to generate a 2N-bit word, and the AMU processes the 2N-bit word as an operand while executing a double precision arithmetic operation (all in a single pipeline cycle). The dual address generation circuitry typically operates only when the system operates in a double precision mode (i.e., when it responds to a set of one or more instructions read from memory 4, where the instructions specify one or more double precision arithmetic operations to be executed by the AMU within ACU 10).

When the system operates in a single precision mode (in which it responds to a set of one or more instructions read from memory 4, said instructions specifying one or more single precision arithmetic operations to be executed by the AMU within ACU 10), the dual address generation circuitry typically does not operate. Rather, during the single precision mode, MMU 3 typically generates two address signals (for reading two N-bit operands from data memory 6) in response to control signals from PCU 2 specifying two address pointers. Both address signals are generated in a single pipeline cycle, the system reads two operands from data memory 6 (using the two address signals) in a subsequent pipeline cycle, and the AMU performs a single precision operation on the operands in a third pipeline cycle. When executing some arithmetic operations (e.g., the identity operation), the AMU perform the operation on a single operand (so that only one operand needs to be supplied to the AMU before such operation).

Figure 6:
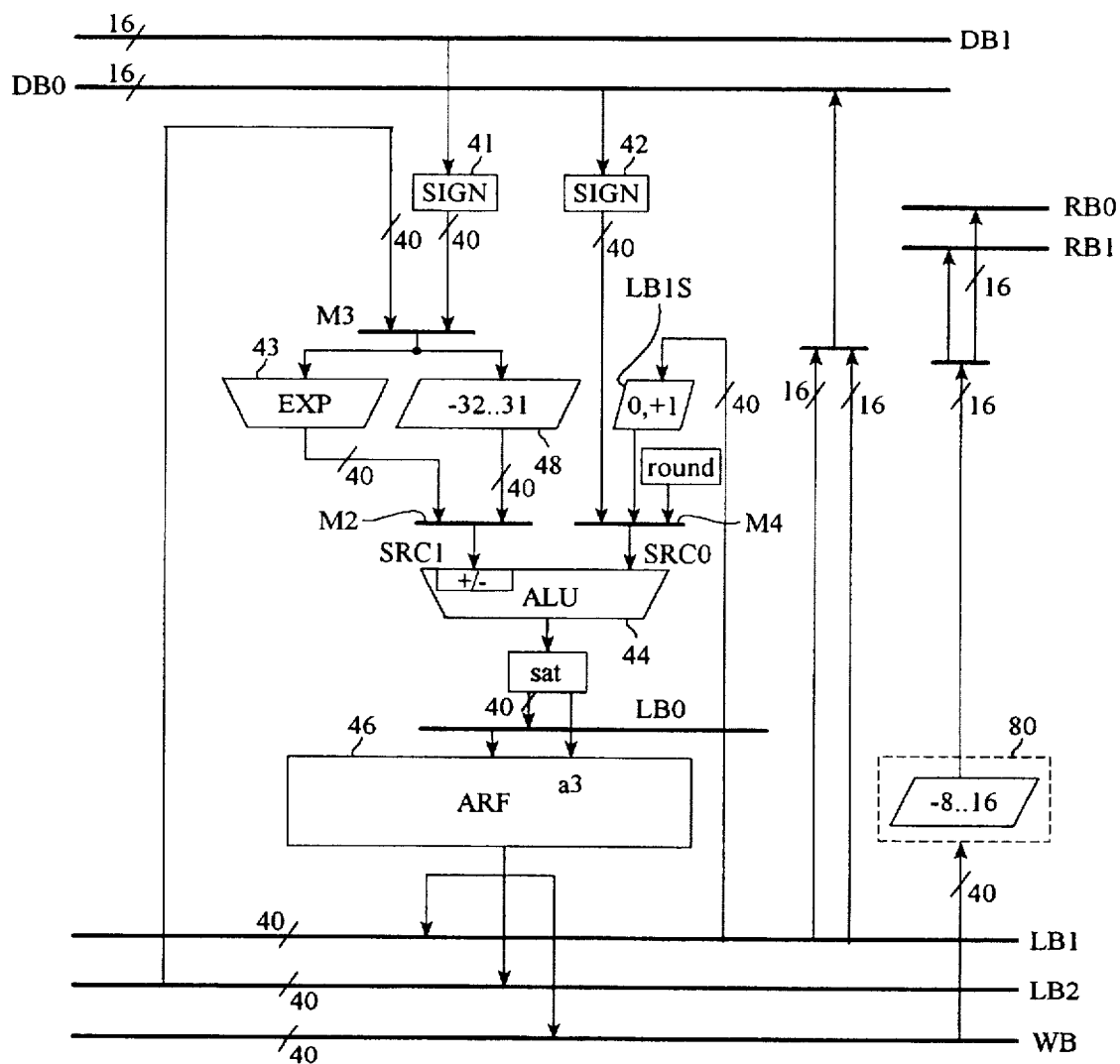
FIG. 6 is a block diagram of an embodiment of the arithmetic manipulation unit (AMU) of the DSP of FIG. 5.
Figure 7:
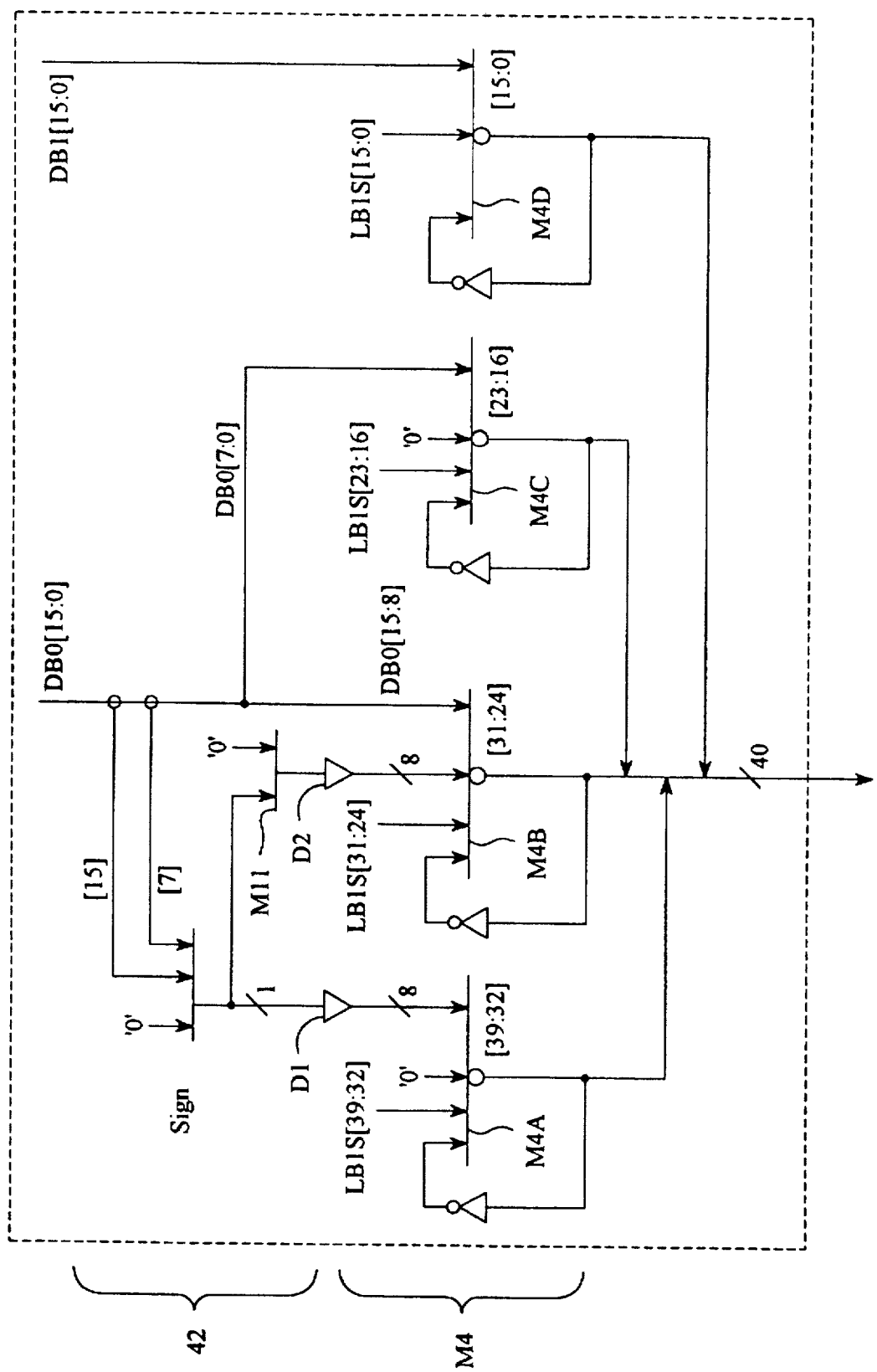
FIG. 7 is a block diagram of a preferred implementation of unit 42 and multiplexer M4 of the circuit of FIG. 6, which embodies the invention.

The AMU of the invention preferably includes circuitry of the type shown in FIG. 7 for receiving and concatenating two N-bit words from data memory 6 thereby producing a 2N-bit operand in a single pipeline cycle, and circuitry of the type shown in FIG. 6 for performing an arithmetic operation on the 2N-bit operand in the same pipeline cycle.

We next describe the preferred embodiment of the DSP of the invention in greater detail, with reference to FIGS. 3–8.

Figure 3:
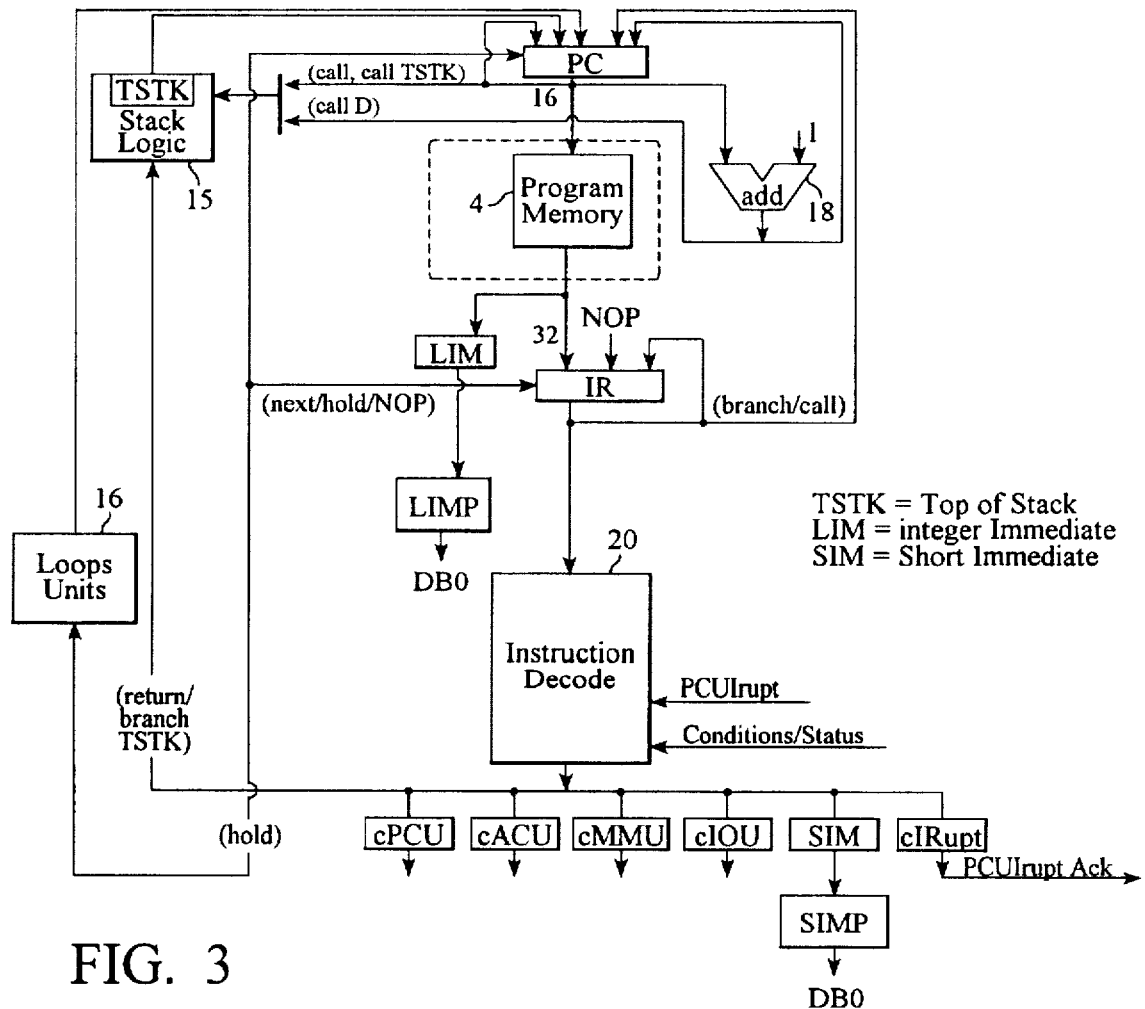
FIG. 3 is a schematic block level diagram of a preferred implementation of the program control unit (PCU 2) of the DSP of FIG. 1.

FIG. 3 is a diagram of a preferred implementation of program control unit (PCU) 2 of the preferred embodiment of the inventive DSP. PCU 2 of FIG. 3 receives (at instruction register IR) a sequence of 32-bit instructions from program memory 4, generates control signals for controlling execution of the instructions, and stores the control signals in selected ones of registers cPCU, cACU, cMMU, cIOU, and cIRupt.

As shown in FIG. 3, PCU 2 includes program counter register PC for storing a sequence of 16-bit instruction addresses (for use in addressing program memory 4), and instruction register IR for receiving a 32-bit word (either a data value or an instruction) read from program memory 4 in response to each instruction address asserted from register PC to memory 4. In executing a program comprising a sequence of instructions, PCU 2 loads a sequence of 16-bit instruction addresses into register PC for addressing program memory 4, and instruction register IR (and/or below-discussed register LIM) receives a sequence of 32-bit words from program memory 4 (memory 4 asserts one 32-bit word to register IR or register LIM in response to each 16-bit instruction address asserted from register PC to memory 4).

PCU 2 also includes instruction decode unit 20 which includes logic circuitry for receiving and processing 32-bit words from instruction register IR. In response to each instruction word in register IR, unit 20 decodes such word to generate therefrom a set of control bits for controlling operation of the system (e.g., control bits which are asserted from unit 20 to register cMMU, and then from register cMMU to MMU 3 for use in controlling a read of data from data memory 6, or control bits which are asserted from unit 20 to register cACU, and then from register cACU to ACU 10 for use in controlling execution of a single or double precision arithmetic operation by the AMU of ACU 10).

PCU 2 of FIG. 3 also includes stack logic 15 (including "top of stack" register TSTK), adder 18, and loop unit 16. A preferred implementation of loop unit 16 is described in the above-referenced U.S. patent application Ser. No. 08/581,167 (filed on Dec. 29, 1995).

Each time register PC asserts an instruction address to program memory 4 (during each "fetch" cycle of the pipelined operation to be described below), adder 18 increments this instruction address (by adding "1" thereto). The incremented address asserted at the output of adder 18 can be asserted directly to register PC or to stack logic 15. In one operating mode, the incremented address is asserted from adder 18 to register PC. In another operating mode, the register PC is updated with the contents of register TSTK (rather than with the output of adder 18).

Stack logic 15 implements a sixteen level deep hardware last-in-first-out (LIFO) stack for execution of program calls and returns for subroutine branching. A stack pointer selects which one of the sixteen registers is accessed. A read from register TSTK (to register PC) pops the stack, and a write to register TSTK pushes a return address into the stack. At appropriate times during execution of a sequence of instructions from memory 4, the incremented address from adder 18 is written to top of stack register TSTK (so that the incremented address is the next address loaded to program counter register PC).

When implementing the five stage instruction pipeline described below with reference to FIG. 4, it takes two cycles to execute a program branch as follows. During a fetch cycle, a branch instruction is fetched from memory 4 and saved in register IR. Then, in the decode cycle, unit 20 decodes the instruction in register IR and the branch address is placed in register PC to cause the program to branch to the new address. If the instruction is a call instruction, in the same cycle, the return address is pushed into a location in the stack pointed to by an incremented value of the stack pointer. Then, when a return from a subroutine occurs, the contents of this location are loaded (i.e., the return address) into register PC and the stack pointer is decremented.

Loop unit 16 includes logic circuitry for executing a group of instructions a pre-specified number of times, in response to control bits generated by unit 20 (which can be stored in register cPCU and then asserted from register cPCU to unit 16). Preferably, initialization of unit 16 is performed independently from operation of unit 16 (to execute looped instructions) so that initialization need not be performed in response to initialization bits which immediately precede the instructions to be looped. Also preferably, unit 16 is designed so it requires neither a special "start of loop" instruction at the beginning of the group of instructions to be looped nor a special "dedicated branch" instruction at the end of such group of instructions.

Figure 5:
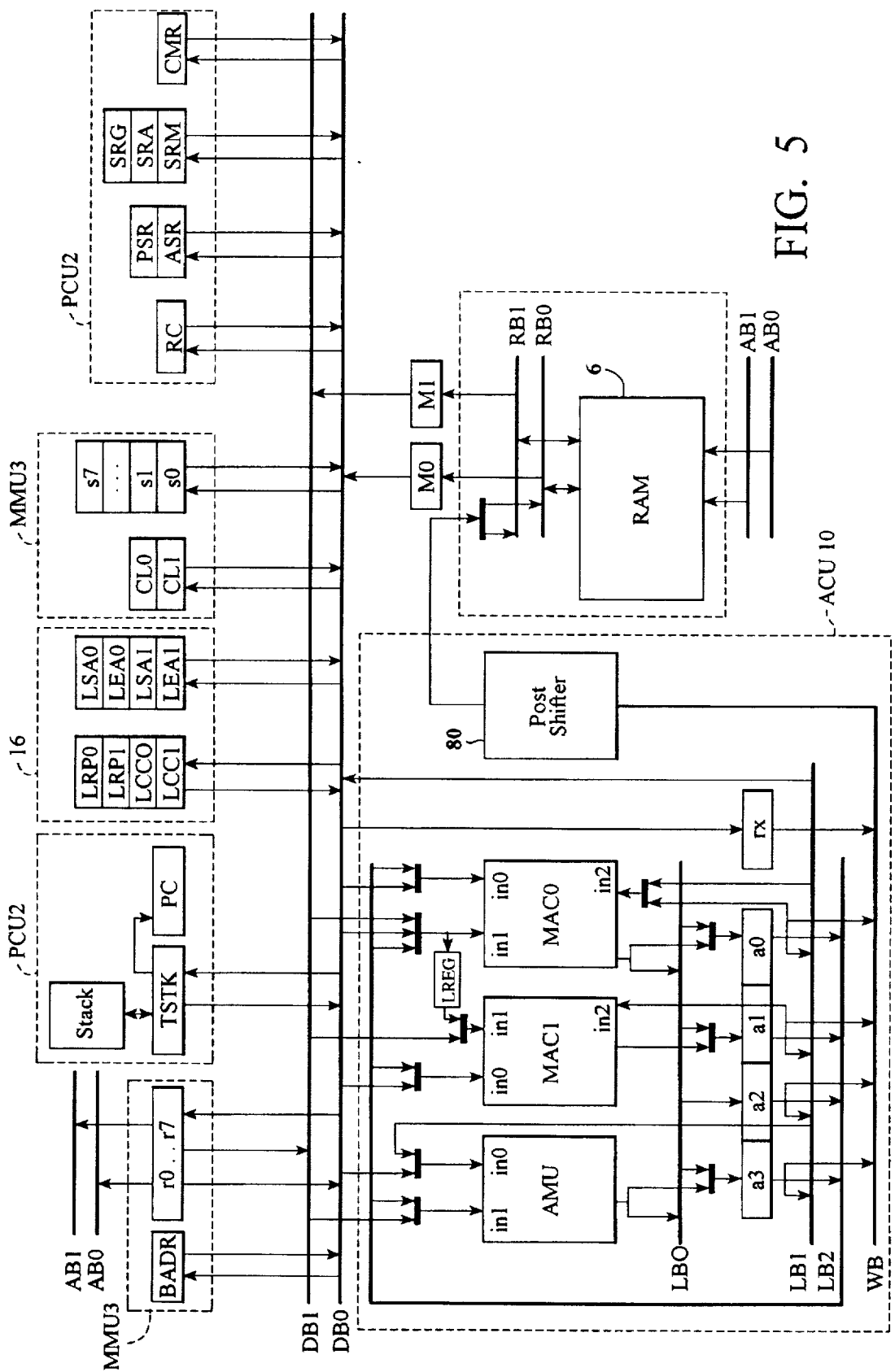
FIG. 5 is a block diagram of the DSP of FIG. 1, showing registers and buses included therein and a preferred structure for arithmetic computational unit (ACU) 10 thereof.

PCU 2 preferably includes additional registers (e.g., repeat counter register RC, post shifter register PSR, arithmetic manipulation unit shift register ASR, status registers SRG, SRA, and SRM, and control/mode register CMR, shown in FIG. 5) for storing control and status bits for assertion to bus DB0 at appropriate times during system operation.

Figure 4:
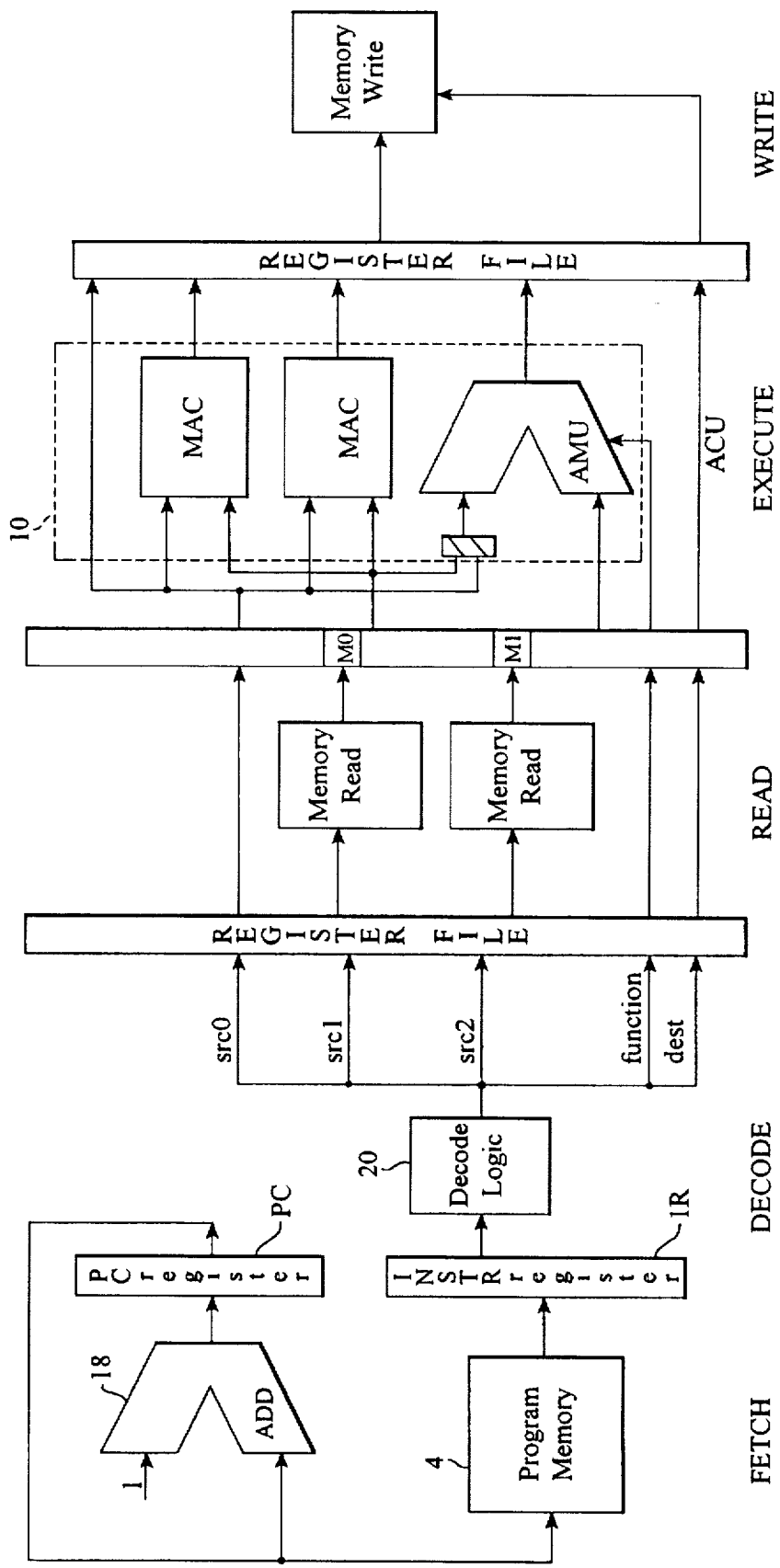
FIG. 4 is a diagram of the pipelined manner in which the DSP of FIGS. 1 and 3 preferably executes a sequence of instructions from program memory 4.

FIG. 4 is a diagram of a five stage instruction pipeline in accordance with which the preferred embodiment of the inventive DSP (including PCU 2 described with reference to FIG. 3) preferably executes a sequence of instructions from program memory 4. This pipeline is a "five stage" pipeline in the sense that five clock cycles (referred to as "fetch," "decode," "read," "execute," and "write" cycles) are required to execute one instruction. However, a new instruction can be received from program memory 4 every clock cycle, so that the effective number of clock cycles per instruction (averaged over many clock cycles) is one. The pipeline is implemented with a "register-memory" architecture, in the sense that an access of the data memory (memory 6) is part of an instruction. This is different from a "load-store" architecture, where a memory is accessed only with a move operation (e.g., specific "load" and "store" instructions).

During the first (Fetch) cycle of the pipeline, a word (which is typically an instruction) is fetched from program memory 4. The following description of the pipeline (with reference to FIG. 4) assumes that the word is an instruction. Also during the Fetch cycle, the instruction fetched from memory 4 is put into instruction register IR, and program counter register PC is updated with a new instruction address (which can be an incremented address asserted at the output of adder 18).

Then, during the Decode cycle of the pipeline, instruction decoding unit 20 receives and decodes the instruction in register IR, thereby generating control signals (control bits) for controlling execution of the instructions. Unit 20 stores the control signals in selected ones of instruction control registers cPCU, cACU, cMMU, cIOU, and cIRupt as follows: control bits for ACU 10 are stored in register cACU, control bits for memory management unit 3 (such as control bits src0, src1, and src2) are stored in register cMMU, control bits for PCU 2 are stored in register cPCU, control bits for IOU 12 are stored in register cIOU, and control bits for an interrupt controller (optionally included within IOU 12) are stored in register CIRupt. Also, MMU 3 receives any control bits src0, src1, and/or src2 that are generated by unit 20 during the Decode cycle. MMU 3 decodes at least those of these control bits which determine addresses for reading data from memory 6, and MMU 3 generates address signals needed for performing such read operations (so that MMU 3 is ready to assert these address signals on address bus AB0 and/or address bus AB1 at the start of the next cycle of the pipeline which is the "Read" cycle of the instruction).

Then, during the Read cycle, data is read from one or two locations within data memory 6. The data read from one such location is written to register M0 (shown in FIG. 1), and the data read from the other location is written to register M1 (also shown in FIG. 1). Any post-modification of address signals to be performed by MMU 3 is also performed during the Read cycle (so that the modified address signals can be used during subsequent Read and/or Write cycles). Any data values (in contrast with instructions) fetched from program memory 4 during the preceding "Fetch" are also pipelined (transferred to their appropriate destinations during the Read cycle.

Then, during the "Execute" cycle, computations are performed (typically by ACU 10) on the data values residing in the source registers of each data processing unit (e.g., arithmetic manipulation unit "AMU" or one of multiply/accumulate unit "MAC0" and "MAC1" within ACU 10, as shown in FIG. 5) for performing such computations. For example, ACU 10 receives and processes data values from appropriate registers (e.g., registers LIMP or SIMP within PCU 2, or registers M0 or M1, or registers within ACU 10) during the Execute cycle. Each data processing unit places the resulting processed data values in appropriate registers (e.g., in appropriate ones of accumulator registers a0, a1, a2, and a3 within ACU 10, as shown in FIG. 5).

Then, during the final ("Write") cycle, processed data values are written back to data memory 6. Optionally also, some post-processing such as post-shifting, is performed on the processed data values (e.g., by post shift 80 within ACU 10, as shown in FIG. 5) before they are written into memory 6.

Additional details of a preferred implementation of the "Read" and "Write" cycles of the FIG. 4 pipeline will be discussed below with reference to FIG. 5.

The control bits asserted to MMU 3 from PCU 2 in the Decode cycle include bits which determine addresses (typically, the bits determine one or two address pointers, and each address pointer determines one or two addresses), and the addresses in turn determine memory locations of memory 6 from which data are to be read (during the Read cycle) or to which processed data are to be written (during the Write cycle).

For example, PCU 2 can assert control bits src0, src1, and/or src2 to MMU 3 during the Decode cycle, where some of these control bits determine addresses of two data values to be read from two locations of memory 6 (during the Read cycle of the instruction), and the remaining ones of the control bits determine the address of a location of memory 6 to which a processed data value (to be generated during the Execute cycle which follows the Read cycle) is to be written (during the Write cycle which follows the Execute cycle). MMU 3 can be controlled in any of several ways to generate address signals that determine these three addresses. For example, field src0 can determine an 8-bit offset to be concatenated with an 8-bit "base" address (prestored in register BADR, shown in FIG. 5, within MMU 3) to generate a 16-bit address (for one of the data values to be read from memory), and the 16-bit address is then asserted on address bus AB0 or AB1. For another example, field src1 can determine both a destination (one of address pointer registers r0–r7) and a source (e.g., a register external to MMU 3 and connected along bus DB0, or one of circular address registers CL0 or CL1 within MMU 3 when MMU 3 operates in a circular addressing mode, or one of pointer modifier registers s0–s7 within MMU 3 when MMU 3 operates in a post-modification mode in which a prestored address in the destination is to be modified by a value in one of registers s0–s7). The address in the source (or an address determined by the address in the source) is then loaded to the destination, either during the Decode cycle (where the address in the destination is for a read operation) or during the Read cycle (where the address in the destination is for a write operation). An example of the latter operation (performed in the Read cycle) is post-modification of a prestored address in one of registers r0–r7 by overwriting at least a portion thereof with a value in one of registers s0–s7.

MMU 3 pipelines the addresses for read and write operations (for executing a single instruction), in the following sense. MMU 3 asserts addresses (for use in reading data from memory 6) on address bus AB0 and/or address bus AB1 at the start of the instruction's Read cycle. However, MMU 3 delays assertion of an address (for use in writing processed data to memory 6) on address bus AB0 or address bus AB1 until the start of the instruction's Write cycle, even though MMU 3 may have generated this address during a previous pipeline cycle (in response to control bits received from PCU 2 during the instruction's Decode cycle).

Preferably, the DSP includes a dedicated bus (e.g., special-purpose write bus WB shown in FIG. 5) for writing processed data bits from a data processing unit (e.g., ACU 10 as shown in FIG. 5) to a data memory (e.g., memory 6 as shown in FIG. 5), during the Write cycle of an instruction pipeline). More specifically, as shown in FIG. 5, ACU 10 preferably includes accumulator registers a0, a1, a2, and a3 for storing processed data values output from units AMU, MAC0, and/or MAC1 during an Execute cycle. Each of registers a0, a1, a2, and a3 is preferably a 40-bit register for storing a word consisting of eight guard bits, a 16-bit "high word" portion, and a 16-bit "low word" portion. Also within ACU 10, three local buses (LB0, LB1, LB2) interconnect the output and input of each of ACU 10's processor units AMU, MAC0, and MAC1 with accumulator registers a0, a1, a2, and a3.

A first portion of dedicated write back bus WB connects accumulator registers a0, a1, a2, and a3 with the input of post shift unit 80, and a second portion of bus WE connects the output of post shift unit 80 to RAM bus 0 (RB0) and/or to RAM bus 1 (RB1). The function of post shift unit 80 is to shift (to the right or to the left) the bits of each 40-bit data value transferred from one of the accumulator registers over bus WB (during the Write cycle of an instruction), and to select a subset of the shifted bits for assertion to bus RB0 or bus RB1. By connecting post shift unit 80 closer to accumulator registers a0, a1, a2, and a3 than to buses RB0 and RB1, a relatively long portion of write bus WB (the portion between unit 80 and buses RB0 and RB1) can have smaller width (e.g., 16-bits) than the other portion of write bus WB (the portion between registers a0–a3 and unit 80).

At the start of each Write cycle, post shift unit 80 receives a 40-bit data value from any of accumulator registers a0, a1, a2, and a3, and shifts the bits thereof (preferably by any number of places from zero through eight to the right or by any number of places from zero through sixteen to the left). Either the 16 higher-order bits (other than guard bits) of the value (typically a shifted value, or a zero shifted value) output from unit 80, or the 16 lowest-order bits of the value (typically a shifted value, or a zero shifted value) output from unit 80, are transferred over a second part of the bus WB from unit 80 to a selected one of bus RB0 and bus RB1. Each 16-bit data value placed on bus RB0 (from unit 80) is written (through one port of data memory 6) to a memory location in memory 6 determined by an address that has been asserted to address bus AB0 from MMU 3 (during the same Write cycle), and each 16-bit data value placed on bus RB1 (from unit 80) is written (through the other port of data memory 6) to a memory location in memory 6 determined by an address that is asserted to address bus AB1 from MMU 3 (during the same Write cycle). Thus, in effect, any 16-bit portion of a data value in one of registers a0, a1, a2, and a3 can be written during the Write cycle to memory 6. When no shift (i.e., a zero shift) is implemented by unit 80, unit 80 preferably operates in a default mode in which it asserts to bus RB0 (or RB1) the 16-bit "higher-order word" portion of the 40-bit value asserted from one of registers a0, a1, a2, and a3 to the input of unit 80. In addition, zero shift could be specified with the low word asserted.

Control bits determining the amount of each shift to be performed by unit 80 are written by PCU 2 to "post shift" register PSR (shown in FIG. 5) in response to an instruction from program memory 4. The PSR is not, however, loaded during the same post shift instruction. The PSR can be loaded in a separate move instruction in the PCU 2 and then later used in a post-shifting instruction or a post-shift value is specified in the same post-shifting instruction. In the latter case, PSR is not affected and its contents are not altered with that post shift value. In addition, unit 80 operates in response to control bits in control/mode register CMR, which has a control bit of PSRdis (or PSR disable), which determines whether or not the post-shifting operation uses the PSR register.

Preferably, the DSP is programmed to execute instructions in a pipelined manner (in which addresses for reads from a memory are asserted on an address bus in one pipeline cycle and addresses for writes to the memory are asserted on the same address bus in a different pipeline cycle), and in a manner avoiding expected address bus and data bus conflicts or collisions.

Figure 8:
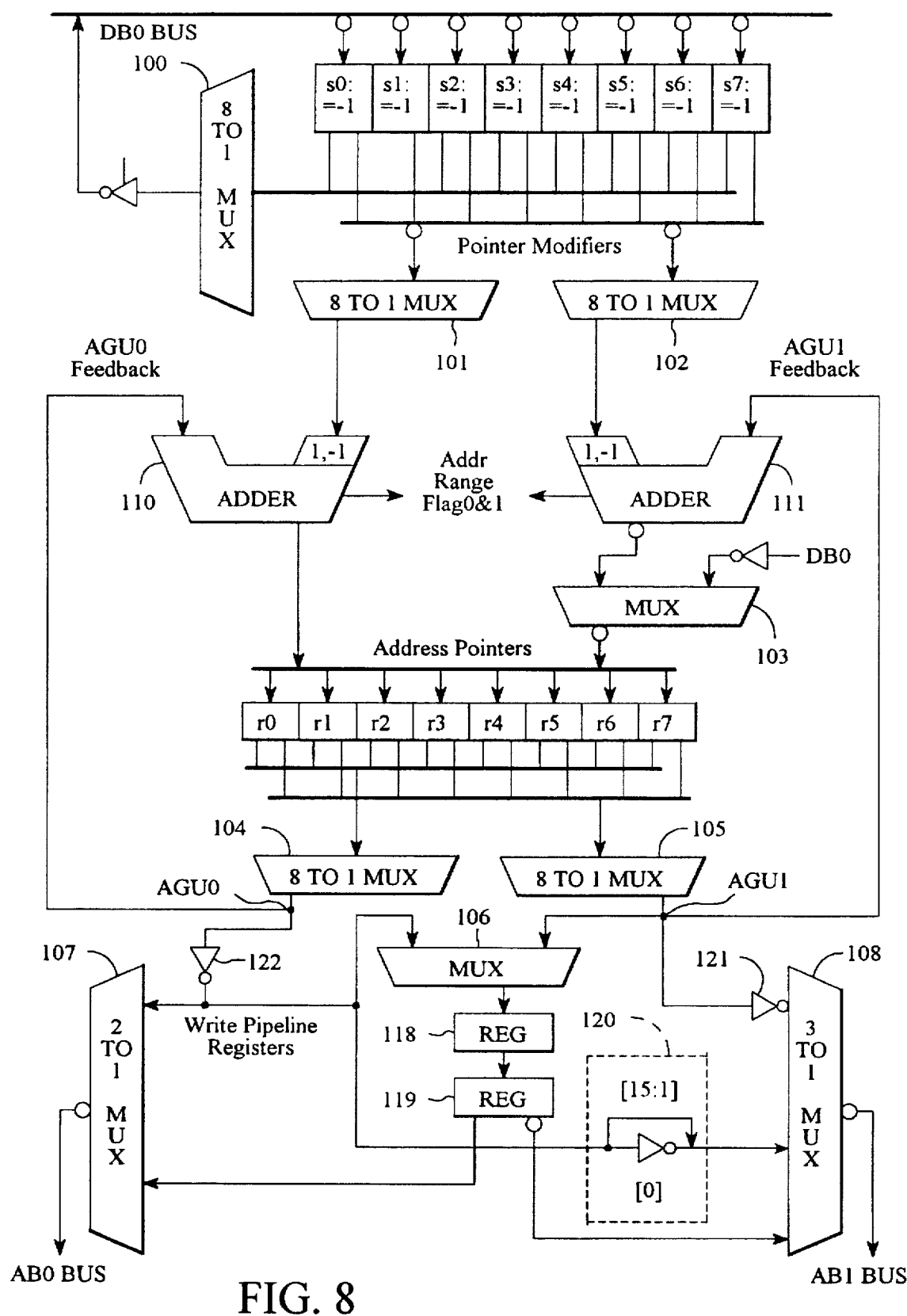
FIG. 8 is a block diagram of a portion of a preferred implementation of MMU 3 of FIG. 1, which is included in a preferred embodiment of the invention.

Next, we describe a preferred implementation of MMU 3 in greater detail with reference to FIG. 8. As shown in FIG. 8, MMU 3 includes eight 16-bit address pointer registers r0–r7, eight 8-bit pointer modifier registers s0–s7, two 16-bit adders (110 and 111), multiplexers (100, 101, 102, 103, 104, 105, 106, 107, and 108), pipeline registers (118 and 119), and inversion circuit 120, connected as shown.

The FIG. 8 embodiment of MMU 3 comprises two independent address generation units (AGU0 and AGU1) for asserting two 16-bit address signals (the output of multiplexer 107 and the output of multiplexer 108) independently to address buses AB0 and AB1, in response to any two of control signals src0, src1, and src2 received from PCU 2. In response to any two of control signal src0, src1, and src2, MMU 3 asserts one 16-bit address pointer from any of address pointer registers r0–r7 through multiplexer 104 to Node AGU0, and another 16-bit address pointer from any of registers r0–r7 through multiplexer 105 to Node AGU1. In a single precision mode of operation, the pointer at Node AGU0 is asserted through inverter 122 and then through multiplexer 107 to address bus AB0 (for use in reading one N-bit operand from memory 6), and the pointer at Node AGU1 is asserted through inverter 121 as shown to multiplexer 108, and through multiplexer 108 to address bus AB1 (for use in reading a second N-bit operand from memory 6). In one type of double precision operation, both the pointer at Node AGU0 is asserted through inverter 122 and then through multiplexer 107 to address bus AB0 (for use in reading one N-bit part of a 2N-bit operand from memory 6), and the pointer at Node AGU1 is asserted through inverter 121 and then through multiplexer 108 to address bus AB1 (for use in reading a second N-bit part of the same 2N-bit operand from memory 6).

In another type of double precision operation, in any Decode cycle of a double precision mode of operation MMU 3 is provided with (and responds to) only one of control bits src0, src1, and src2 (from PCU 2). MMU 3 responds to said one of signals src0, src1, and src2 by asserting one 16-bit pointer from one of registers r0–r7 through multiplexer 104 to Node AGU0. This pointer is asserted (unmodified except for being inverted in inverter 122) through multiplexer 107 to address bus AB0 (for use in reading one N-bit part of a 2N-bit operand from memory 6). After undergoing inversion in inverter 122, the pointer is modified in circuit 120 and the resulting modified pointer is asserted from circuit 120 to multiplexer 108 and through multiplexer 108 to address bus AB1 (for use in reading a second N-bit part of the same 2N-bit operand from memory 6).

The function of circuit 120 is to flip (invert) the least significant bit (bit "[0]") of the pointer received at circuit 120 from inverter 122, while also passing through (to multiplexer 108) without modification the fifteen most significant bits (bits "[15:0]") of the pointer received at circuit 120 from inverter 122.

With reference to the preferred embodiment shown in FIG. 8, circuit 120 flips the least significant bit (but not the fifteen most significant bits) of the pointer because the FIG. 8 embodiment of MMU 3 contemplates that the DSP stores two N-bit parts of a 2N-bit operand (to be read from data memory 6 in a double precision mode) in consecutive locations in data memory 6. Thus, this embodiment of MMU 3 enables the DSP to read both N-bit parts of an 2N-bit operand in a single cycle using a single address pointer asserted to Node AGU0 (by generating two address signals identifying two consecutive data memory locations in response to this pointer, in the same cycle that MMU 3 asserts the pointer to Node AGU0). For example, where the two N-bit parts are stored in consecutive locations in memory 6 and the pointer received by circuit 120 identifies an even address (e.g., address 0000000000000110), multiplexer 107 outputs this address to bus AB0 (so that the system fetches a first N-bit part of an operand from the even memory location determined thereby), and circuit 120 outputs the next odd address (address 0000000000000111) so that multiplexer 108 outputs this odd address to bus AB1 (and the system fetches the second N-bit part of the operand from the next odd memory location). For another example, where the two N-bit parts are stored in consecutive locations in memory 6 and the pointer received by circuit 120 identifies an odd address (e.g., address 0000000000000111), multiplexer 107 outputs this address to bus AB0 (so that the system fetches a first N-bit part of an operand from the odd memory location determined thereby), and circuit 120 outputs the preceding (next lowest) even address (address 0000000000000110) so that multiplexer 108 outputs this even address to bus ABE (and the system fetches the second N-bit part of the operand from the preceding memory location).

The function of registers s0–s7 and adders 110 and 111 of FIG. 8 is to replace the contents of address pointer registers r0–r7 with modified pointers, in the following manner. Each of pointer modifier registers s0–s7 (preferably eight bits wide, for storing a signed number comprising a sign bit and seven data bits) is associated with one of pointer registers r0–r7. At an appropriate time during an address generation cycle (e.g., after a pointer is asserted to one or both of Nodes AGU0 and AGU1), multiplexer 101 selects one of registers s0–s7 and supplies the modifier word stored therein to one input of addition/subtraction unit 110, the other input of unit 110 receives the pointer stored in the corresponding one of pointer registers r0–r7, and the sum (or difference) of the pointer and the modifier word is asserted from the output of unit 110 into the corresponding one of pointer registers r0–r7. In parallel with the operation described in the previous sentence, multiplexer 102 selects one of registers s0–s7 and supplies the modifier word stored therein to one input of addition/subtraction unit 111 (which is identical to unit 110), the other input of unit 111 receives the pointer stored in the corresponding one of pointer registers r0–r7, and the sum (or difference) of the pointer and the modifier word is asserted from the output of unit 111 (through multiplexer 103) into the corresponding one of pointer registers r0–r7. Thus, pointers prestored in two (or alternatively, one or none) of registers r0–r7 undergoes post-modification in which each is modified by a value stored in one of registers s0–s7. Alternatively (other than in a post-modification mode), multiplexer 103 can select a sixteen-bit data word from data bus DB0 (rather than the output of unit 111) and assert this data word to one of registers r0–r7 to replace the contents of said one of registers r0–r7.

The FIG. 8 circuitry also includes write address circuitry 106, 118, and 119 for delayed assertion of a write address to address bus AB0 or address bus AB1. Multiplexer 106 receives a pointer from Node AGU0 (after the pointer has been inverted by inverter 122) and also a pointer from Node AGU1, and asserts a selected one of them to pipeline register 118. Pipeline register 118 delays the selected pointer by one pipeline cycle, and then pipeline register 119 delays the selected pointer by another pipeline cycle. At one output of register 119, the selected pointer is inverted and the inverted pointer is asserted to multiplexer 108. From the other output of register 119, the selected pointer is asserted to multiplexer 107. Thus, a write address asserted by multiplexer 104 or 105 (during a "Decode" cycle of the pipeline) is delayed by two pipeline cycles (in registers 118 and 119), so that the write address is asserted by multiplexer 107 to address bus AB0 (or is inverted and asserted by multiplexer 108 to address bus AB1) at the start of the next "Write", cycle.

Next, with reference to FIGS. 6 and 7, we describe a preferred implementation of arithmetic manipulation unit (AMU) of FIG. 5. This AMU includes sign extension unit 42 and multiplexer M4 (shown in more detail in FIG. 7) which can be controlled to receive and concatenate two N-bit words from data memory 6 thereby producing a 2N-bit operand in a single pipeline cycle in accordance with the invention, and circuitry (including arithmetic logic unit 44) for performing an arithmetic operation on the 2N-bit operand in the same pipeline cycle.

The AMU of FIG. 6 includes sign extension unit 41 (which receives 16-bit data words from bus DB1), sign extension unit 42 (which receives 16-bit data words from both bus DB0 and bus DB1), multiplexer M3, exponent extraction unit 43, input shifter circuit 48, multiplexer M2, multiplexer M4, arithmetic logic unit 44 (for performing any selected one of several simple logic and arithmetic operations), and accumulator register file 46 (which includes above-discussed registers a0, a1, a2, and a3 shown in FIG. 5).

The AMU of FIG. 6 receives data either from data bus DB0 or DB1, or from its internal feedback paths (which include internal bus LB1 and internal bus LB2). Each 16-bit word from bus DB0 is processed in sign extension unit 42 and then multiplexer M4 (to generate therefrom an extended 40-bit word) in one of several ways (each in response to control bits from PCU 2). Unit 42 and multiplexer M4 can be controlled to add an 8-bit sign/zero extension (e.g., eight identical zero bits, or eight identical sign bits) as the eight most significant bits of the extended word, and to concatenate a 16-bit word from bus DB0 with a 16-bit bit extension (which can consist of sixteen identical default bits such as "0" bits, or can consist of a 16-bit word from bus DB1) as the sixteen least significant bits of the extended word. In a double precision mode of operation (to be described in more detail with reference to FIG. 7), the thirty-two least significant bits of such an extended word are a double precision operand consisting of sixteen bits from bus DB0 and sixteen bits from bus DB1 (to be processed in arithmetic logic unit (ALU) 44 with a second 32-bit operand that has been fed back from bus LB2 through multiplexer M3 to ALU 44). The 32-bit operand fed back from bus LB2 is concatenated with an 8-bit extension (consisting of guard bits and/or sign bits) so that a total of 40 bits are fed back from bus LB2. In a single precision mode of operation, the thirty-two least significant bits of the extended word asserted at the output of multiplexer M4 include a single precision operand consisting of sixteen bits from bus DB0 (to be processed in ALU 44 with a second 16-bit operand from bus DB1) and sixteen default bits.

In the single precision mode, each 16-bit word from bus DB1 is processed in sign extension unit 41 (to generate therefrom an extended 40-bit word) in one of several ways (each in response to control bits from PCU 2). Unit 41 adds an 8-bit sign/zero extension (e.g., eight identical zero bits, or eight identical sign bits) as the eight most significant bits of the extended word, and unit 41 also adds a 16-bit bit extension (which can consist of sixteen identical "0" bits, or can consist of a duplicate of the original 16-bit word from bus DB1) as the sixteen least significant bits of the extended word. Circuits 41, 42, M3 and M4 operate in response to control bits supplied thereto from PCU 2.

Multiplexer M3 selects either a 40-bit extended word from unit 41 or a 40-bit processed word from bus LB2 (in response to control bits from PCU 2). Multiplexer M4 outputs a 40-bit extended word from unit 42, or a 40-bit processed word from bus LB1 (or a version of the latter 40-bit word which has been shifted by one bit), or a constant value (e.g., "X8000") for use in a rounding operation in ALU 44, in response to control bits from PCU 2.

Exponent extraction unit 43 searches for redundant sign bits in each 40-bit word it receives from circuit M3, and outputs a data value indicative of the required shift value (from −8 to +31) to move the sign bit (of the input word received by unit 43) to a desired bit location. Circuit 48 can be controlled to implement an arithmetic shift operation (to the left or right), a logical shift operation (to the left or right), or a rotate operation (to the left or right) on each 40-bit word that it receives from multiplexer M3. Each such 40-bit input word can be an extended word output from unit 41, or a 40-bit word from bus LB2.

ALU 44 preferably includes a number of processing elements, each for performing a different logic operation (including "AND," "OR," and "XOR" operations) or arithmetic operation (including addition and subtraction operations, the operation sometimes denoted "max" which determines the larger of two operands, the operation sometimes denoted "min" which determines the smaller of two operands, and the absolute distance operation sometimes denoted "absd" which determines the absolute value of the difference between two operands) on a pair of 40-bit words (32-bit operands with 8-bit extensions) that it receives from multiplexers M2 and M4. The processing elements are independently selectable.

Figure 9:
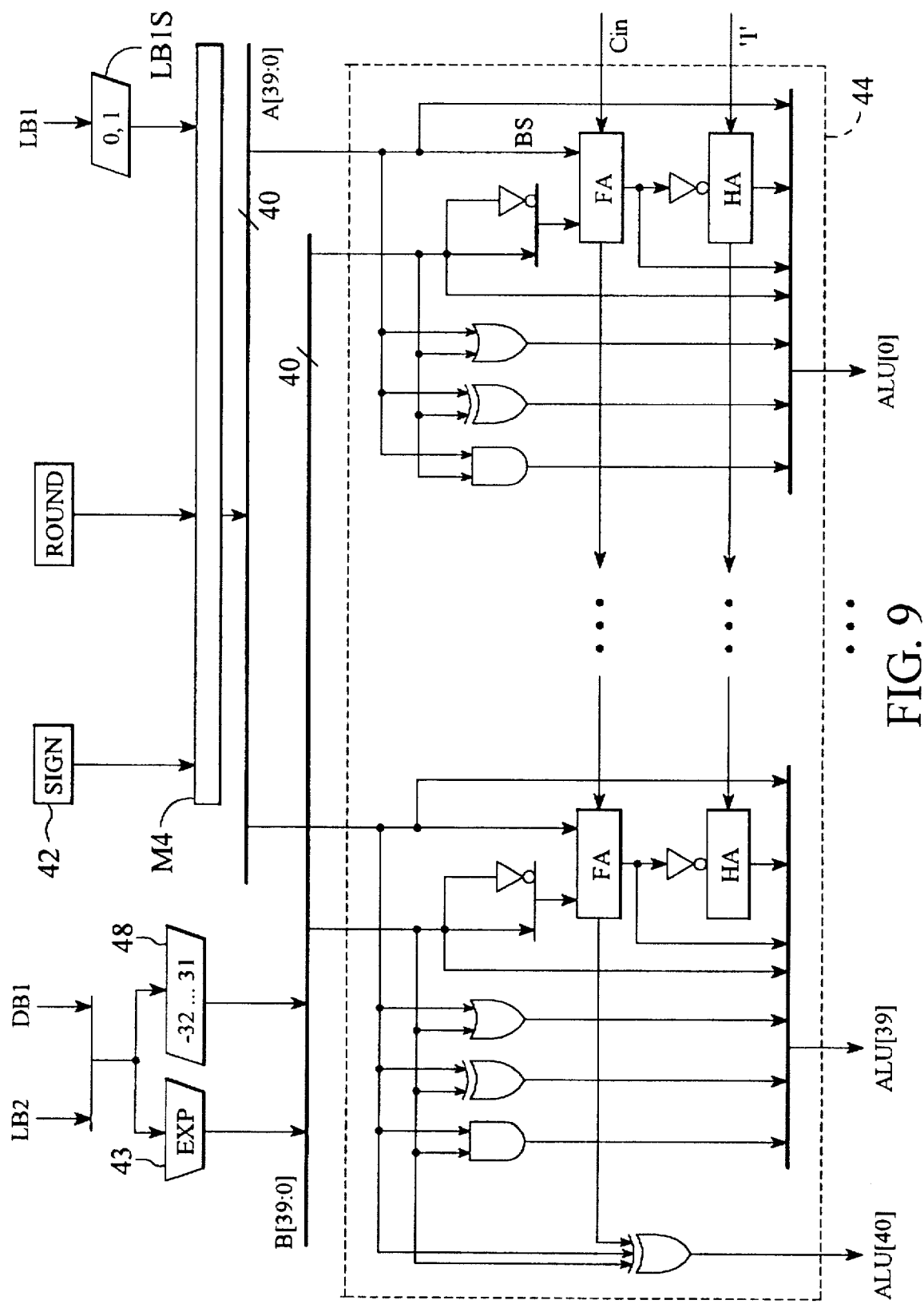
FIG. 9 is a block diagram of a portion of the AMU of FIG. 6, showing a preferred implementation of ALU 44.

FIG. 9 shows a preferred implementation of ALU 44, which includes forty identical processing cells, each for generating a different bit (e.g., the most significant bit "ALU[39]" and the least significant bit "ALU[0]") of the 40-bit processed word output from ALU 44. Each cell includes an AND gate, an OR gate, and an XOR gate, so that ALU 44 can be controlled to perform any selected one of these three logical operations on a pair of operands. Each cell also includes a full adder (FA) followed by a half adder (HA) in order to generate the 2's complement of a number in order to execute the absolute distance operation, so that ALU 44 can also be controlled to perform any selected one of the mentioned addition, subtraction, "max," "min," and absolute distance operations on a pair of operands.

The output of ALU 44 is supplied (preferably through a saturation detector as shown in FIG. 6, which saturates the output of ALU 44 upon detecting an overflow condition) to one of accumulator registers a0, a1, a2, and a3 within register file ("ARF") 46. As described above, a data value stored in an accumulator register within ARF 46 can be transferred over write bus WB to post shift unit 80, and from post shift unit 80 over a second part of the bus WB to bus RB0 or RB1 (and then to memory 6). Alternatively, a data value stored in a register within ARF 46 can be transferred over bus LB1 back to one of the circuits providing inputs to circuit M4 (or to bus DB0), or over bus LB2 back to circuit M3.

FIG. 7 is a preferred embodiment of sign extension unit 42 and multiplexer M4 of FIG. 6. The input data to be selected by M4 includes the following: a 40-bit processed word LB1S (the output of one-bit shifter LB1s, which is either an unshifted 40-bit word from bus LB1 or said word shifted by one bit); a 40-bit constant value (e.g., a word "X8000" designated in hexadecimal notation, of which "8000" are the sixteen least significant bits); a 40-bit word consisting of a 16-bit word from bus DB0 to which eight sign bits have been concatenated (as the most significant bits) and sixteen default ("zero") bits have been concatenated (as the least significant bits); and a 40-bit word consisting of a 16-bit word from bus DB0 to which eight sign bits have been concatenated (as the most significant bits) and a 16-bit word from bus DB1 has been concatenated (as the least significant bits). As shown in FIG. 7, unit 42 includes: a multiplexer labeled "Sign" which outputs one of a "zero" bit, the most significant bit of the word from DB0, and the eighth most significant bit of the word from DB0; a circuit D1 for concatenating the output of "Sign" with itself eight times; a multiplexer M11 which outputs one of a "zero" bit and the output bit from "Sign;" and a circuit D2 for concatenating the output of M11 with itself eight times. As also shown in FIG. 7, multiplexer M4 includes four components (M4A, M4B, M4C, and M4D), which function respectively to select the eight most significant bits of the 40-bit output word of M4, the ninth through sixteenth most significant bits of this output word, the seventeenth through twenty-fourth most significant bits of the output word, and the sixteen least significant bits of the output word. In a double precision mode of operation, the output word of the FIG. 7 circuit consists of an eight bit extension output from multiplexer M4A, and a 32-bit operand consisting of the eight most significant bits of a word from data bus DB0 (output from multiplexer M4B), the eight least significant bits of the word from data bus DB0 (output from multiplexer M4C), and a sixteen-bit word from data bus DB1 (output from multiplexer M4D).

Another aspect of the invention is an arithmetic manipulation unit of the type described with reference to FIG. 6, including the FIG. 7 implementation of circuits 42 and M4. This arithmetic manipulation unit is useful in a DSP of the type described above with reference to FIGS. 1 and 3–5, and alternatively can be used with other DSPs. Variations on such an arithmetic manipulation unit, all of which concatenate two N-bit words to generate an 2N-bit operand and perform an arithmetic operation on this operand (together with a second operand) in a double precision mode of operation and perform an arithmetic operation on two N-bit operands in a single precision mode of operation, are also within the scope of the invention. In preferred embodiments of the inventive arithmetic manipulation unit, N=16. However, N can be equal to another integer (e.g., N=8 or 32) in alternative embodiments. Preferably, the arithmetic manipulation unit of the invention performs any selected one of the following arithmetic operations (each in response to a different control signal from a controller such as PCU 2 of FIG. 1) on two N-bit operands (in its single precision mode) or on two 2N-bit operands (in its double precision mode): an "AND" operation, a nonexclusive "OR" operation, an exclusive "OR" ("XOR") operation, an addition operation, a subtraction operation, the operation sometimes denoted "max" which determines the larger of two operands, the operation sometimes denoted "min" which determines the smaller of two operands, and the operation sometimes denoted "absd" which determines the absolute value of the difference between two operands. The arithmetic manipulation unit can perform any of these eight operations in the same pipeline cycle in which it generates (by concatenation) the first 2N-bit operand. In preferred embodiments, the arithmetic manipulation unit of the invention can perform additional operations (operations in addition to the eight listed operations) in the single precision mode, even where it is capable of performing only these eight operations in the double precision mode.

Preferably also, the inventive arithmetic manipulation unit (AMU) can be controlled to perform a double precision mode operation in which it simply moves into an accumulator (e.g., one of the accumulator registers within ARF 46 of FIG. 6) a 2N-bit operand that it generates (during the same pipeline cycle in which it generates this operand by concatenation, and without altering the operand). For example, the AMU of FIG. 6 can be controlled so that a 40-bit word output from multiplexer M4 (including a 32-bit operand which consists of 16 bits from bus DB0 concatenated with 16 bits from bus DB1) is passed unaltered through ALU 44 and loaded into one of the accumulator registers within ARF 46. Thus, a DSP which embodies the invention (and includes an AMU of the type described in the two previous sentences) can generate two address signals in a single pipeline cycle (from a single address pointer or two address pointers) for reading two N-bit parts of a 2N-bit operand from a memory, and then read the two N-bit parts from the memory in the next pipeline cycle, and finally concatenate the two N-bit parts to generate a 2N-bit ("double precision") word and load this double precision word into an accumulator in the next pipeline cycle. The same DSP can perform the following three-cycle operation: generate two address signals in a single pipeline cycle (from a single address pointer or two address pointers) for reading two N-bit parts of a 2N-bit operand from a memory; then read the two N-bit parts from the memory in the next pipeline cycle; and finally concatenate the two N-bit parts in an AMU to generate a first 2N-bit ("double precision") operand, feed back a second 2N-bit operand to an input of the AMU (from an accumulator of the AMU), and perform a selected one of several arithmetic operations (e.g., the eight arithmetic operations described above) on the two 2N-bit operands in the next pipeline cycle. The same DSP can perform an arithmetic operation on two 2N-bit words from a data memory in two cycles: a first cycle in which the first 2N-bit operand is generated in the AMU (by concatenating two N-bit parts read from the memory) and loaded to an output register (e.g., one of accumulator registers a0–a3) of the AMU; and a second cycle in which the second 2N-bit operand is generated in the AMU (by concatenating a second pair of N-bit parts read from the memory), the first operand is fed back from the output register, and the AMU performs the arithmetic operation on the two operands.

Preferred embodiments of the arithmetic manipulation unit and digital processing system of the invention have been described with reference to FIGS. 1 and 3–8. Although these embodiments have been described in some detail, it is contemplated that many changes from (and variations on) these embodiments can be made without departing from the spirit and scope of the invention as defined by the appended claims.

What is claimed is:

1. A circuit operable in a selected one of a single precision mode and a double precision mode to perform at least one arithmetic operation on data in response to control signals, where the control signals have been generated by executing instructions in a pipelined manner, said circuit including:

arithmetic logic means for performing a selected one of at least two arithmetic operations on a first operand and a second operand thereby generating an output word, said arithmetic logic means having a first input for receiving the first operand and a second input for receiving the second operand;

an accumulator register for receiving the output word from the arithmetic logic means; and an operand circuit, wherein the operand circuit includes:

a first output connected to the first input of the arithmetic logic means for asserting the first operand to the arithmetic logic means;

a second output connected to the second input of the arithmetic logic means for asserting the second operand to the arithmetic logic means;

a third input for receiving a first N-bit data word;

a fourth input for receiving a second N-bit data word, and means, operable in a selected one of the single precision mode and the double precision mode in response to a subset of the control signals, for concatenating the first N-bit data word with the second N-bit data word thereby generating a first 2N-bit operand and asserting the first 2N-bit operand to the second output in a single pipeline cycle in the double precision mode, and for asserting the first N-bit data word to the first output as a first N-bit operand and the second N-bit data word to the second output as a second N-bit operand in the single precision mode, wherein the arithmetic logic means is controllable to assert the first 2N-bit operand unaltered to the accumulator register in the single pipeline cycle in the double precision mode.

2. The circuit of claim 1, wherein the operand circuit also includes:

means operable in the double precision mode for asserting the output word from the accumulator register to the second output, to enable the arithmetic logic means to process the output word as a second 2N-bit operand in the double precision mode.

3. The circuit of claim 2, wherein N=16.

4. The circuit of claim 1, wherein the arithmetic logic means is controllable to execute a selected one of an AND operation, a nonexclusive OR operation, an exclusive OR operation, an addition operation, and a subtraction operation on the first operand and the second operand thereby generating the output word.

5. The circuit of claim 1, wherein the arithmetic logic means is also controllable to execute a selected one of an AND operation on the first operand and the second operand, a nonexclusive OR operation on the first operand and the second operand, an exclusive OR operation on the first operand and the second operand, an addition operation on the first operand and the second operand, a subtraction operation on the first operand and the second operand, a maximum operation which determines a larger of the first operand and the second operand, a minimum operation which determines a smaller of the first operand and the second operand, and an absolute distance operation which determines an absolute difference between the first operand and the second operand.

6. A digital signal processing system, including:

means for executing instructions in a pipelined manner thereby generating a sequence of control signals;

a multi-port data memory;

means for reading two N-bit data words from the data memory during a first pipeline cycle in response to a first set of the control signals; and an arithmetic manipulation unit, which receives the two N-bit data words and includes processing means operable in a single precision mode in response to a second set of the control signals to perform a single precision arithmetic operation in a second pipeline cycle, wherein the processing means is operable in a double precision mode in response to a third set of the control signals to perform a double precision arithmetic operation in the second pipeline cycle, wherein each of the N-bit data words is processed as an N-bit operand in the single precision arithmetic operation, and wherein the processing means includes means for concatenating the N-bit words to generate a first 2N-bit operand during the second pipeline cycle preliminary to performing the double precision arithmetic operation.

7. The system of claim 6, wherein the means for reading includes address generation means for generating two address signals in response to one address pointer during a pipeline cycle prior to the first pipeline cycle, wherein each of the address signals is indicative of an address of a different one of the N-bit data words and the address pointer is determined by the first set of the control signals.

8. The system of claim 7, wherein the N-bit words are stored in consecutive locations in the data memory, the address pointer is indicative of a first one of the locations, and the address generation means includes a circuit for processing the address pointer thereby generating an address signal indicative of a second one of said locations.

9. The system of claim 8, wherein said circuit includes:

means for inverting only a least significant bit of said address pointer.

10. The system of claim 7, wherein the address generation means also includes means for generating two other address signals in response to two address pointers during a pipeline cycle prior to the first pipeline cycle, wherein each of the two other address signals is indicative of an address of a different one of the N-bit data words and the address pointers are determined by the first set of the control signals.

11. The system of claim 6, wherein the arithmetic manipulation unit includes:

arithmetic logic means for performing a selected one of said single precision arithmetic operation and said double precision arithmetic operation, thereby generating an output word; and an accumulator register for receiving the output word.

12. The system of claim 11, wherein the arithmetic manipulation unit also includes:

means operable in the double precision mode for asserting the output word from the accumulator register to an input of the arithmetic logic means, to enable the arithmetic logic means to process said output word as a second 2N-bit operand with the first 2N-bit operand during the double precision mode.

13. The system of claim 11, wherein the arithmetic logic unit is controllable to pass through the first 2N-bit operand unaltered to the accumulator register.

14. The system of claim 6, wherein the arithmetic manipulation unit includes:

an arithmetic logic means for performing a selected one of said single precision arithmetic operation and said double precision arithmetic operation, thereby generating an output word, wherein the arithmetic logic means is controllable to execute a selected one of an AND operation, a nonexclusive OR operation, an exclusive OR operation, an addition operation, and a subtraction operation on a first operand and a second operand thereby generating the output word.

15. The system of claim 6, wherein the arithmetic manipulation unit includes:

an arithmetic logic means for performing a selected one of the single precision arithmetic operation and the double precision arithmetic operation, wherein the arithmetic logic means is controllable to execute a selected one of an AND operation on a first operand and a second operand, a nonexclusive OR operation on the first operand and the second operand, an exclusive OR operation on the first operand and the second operand, an addition operation on the first operand and the second operand, a subtraction operation on the first operand and the second operand, a maximum operation which determines a larger of the first operand and the second operand, a minimum operation which determines a smaller of the first operand and the second operand, and an absolute distance operation which determines an absolute difference between the first operand and the second operand.

16. A method for operating a circuit in a selected one of a single precision mode and a double precision mode to perform an arithmetic operation on data, said method including the steps of:

(a) receiving a first N-bit data word and a second N-bit data word;

(b) operating the circuit in the double precision mode to concatenate the first N-bit data word with the second N-bit data word thereby generating a first 2N-bit operand in a first pipeline cycle;

(c) after step (b), asserting the first 2N-bit operand and a second 2N-bit operand to an arithmetic logic unit and operating the arithmetic logic unit to perform a selected arithmetic operation on the first 2N-bit operand and the second 2N-bit operand thereby generating an output word during a second pipeline cycle.

17. The method of claim 16, wherein the circuit includes an accumulator register, and wherein step (c) includes the step of:

asserting the second 2N-bit operand to an input of the arithmetic logic unit from the accumulator register.

18. The method of claim 17, wherein N=16.

19. The method of claim 17, also including the steps of:

(d) receiving a third N-bit data word and a fourth N-bit data word;

(e) operating the circuit in the single precision mode to assert the third N-bit data word to the arithmetic logic unit as a first N-bit operand and to assert the fourth N-bit data word to the arithmetic logic unit as a second N-bit operand, and operating the arithmetic logic unit to perform a selected arithmetic operation on the first N-bit operand and the second N-bit operand thereby generating a second output word.

20. The method of claim 19, wherein N=16.

21. A method of operating a digital signal processing system in a double precision mode to perform an arithmetic operation on data, said system including first means for executing instructions in a pipelined manner to generate a sequence of control signals and second means for performing the arithmetic operation on the data in response to the control signals, wherein the second means includes an arithmetic logic unit and an accumulator register, said method including the steps of:

(a) receiving a first N-bit data word and a second N-bit data word;

(b) concatenating the first N-bit data word with the second N-bit data word thereby generating a first 2N-bit operand;

(c) loading the first 2N-bit operand into the accumulator register;

(d) after step (c), receiving a third N-bit data word and a fourth N-bit data word;

(e) concatenating the third N-bit data word with the fourth N-bit data word thereby generating a second 2N-bit operand; and (f) supplying the first 2N-bit operand from the accumulator register to the arithmetic logic unit, supplying the second 2N-bit operand to the arithmetic logic unit, and operating the arithmetic logic unit in response to a set of the control signals to perform the arithmetic operation on the first 2N-bit operand and the second 2N-bit operand thereby generating an output word, wherein steps (a), (b), and (c) are performed in a first pipeline cycle, and steps (d), (e), and (f) are performed in a second pipeline cycle immediately following the first pipeline cycle.

22. The method of claim 21, also including the steps of:

(g) asserting an address pointer in response to a first set of the control signals, in a pipeline cycle preceding the first pipeline cycle;

(h) generating two address signals in response to said address pointer during said pipeline cycle preceding the first pipeline cycle, wherein each of the address signals is indicative of an address of a different one of the first N-bit data word and the second N-bit data word.

23. The method of claim 22, wherein the system includes a multi-port data memory, the first N-bit word and the second N-bit word are stored in consecutive locations in the data memory, the address pointer is the indicative of a first one of the locations, and step (h) includes the step of:

inverting only a least significant bit of said address pointer, thereby generating a second one of the address signals which is indicative of a second one of said locations.

* * * * *